(12) United States Patent
Hu

(10) Patent No.: US 10,288,196 B2
(45) Date of Patent: May 14, 2019

(54) TELESCOPIC WATERPROOF TUBE STRUCTURE

(71) Applicant: GUANGDONG SIRUI OPTICAL CO., LTD., Guangdong (CN)

(72) Inventor: Xiaoyun Hu, Guangdong (CN)

(73) Assignee: GUANGDONG SIRUI OPTICAL CO., LTD., Guangdong (CN)

(*) Notice: Subject to any disclaimer, the term of this patent is extended or adjusted under 35 U.S.C. 154(b) by 524 days.

(21) Appl. No.: 14/862,689

(22) Filed: Sep. 23, 2015

(65) Prior Publication Data
US 2016/0169420 A1  Jun. 16, 2016

(30) Foreign Application Priority Data

Dec. 12, 2014 (CN) .......................... 2014 1 0767582

(51) Int. Cl.
| | |
|---|---|
| *F16L 9/22* | (2006.01) |
| *F16M 11/32* | (2006.01) |
| *F16L 9/14* | (2006.01) |
| *F16B 7/14* | (2006.01) |

(52) U.S. Cl.
CPC .............. *F16L 9/22* (2013.01); *F16B 7/1427* (2013.01); *F16L 9/14* (2013.01); *F16M 11/32* (2013.01); *F16B 7/1463* (2013.01); *Y10T 403/32501* (2015.01)

(58) Field of Classification Search
CPC .... F16B 7/1427; F16B 7/1445; F16B 7/1463; F16B 7/10; F16B 7/149; F16M 11/32; F16M 2200/027; F16M 11/28; Y10T 403/32501; F16L 15/02; F16L 9/14; F16L 9/22

USPC ........... 411/266, 267, 269, 277–279; 285/32, 285/145.4; 248/125.8
See application file for complete search history.

(56) References Cited

U.S. PATENT DOCUMENTS

| | | | | |
|---|---|---|---|---|
| 276,660 | A * | 5/1883 | Birch ...................... | F41A 29/02 15/104.165 |
| 2,490,369 | A * | 12/1949 | Neuwirth .............. | F16B 7/1463 248/188.5 |
| 2,503,997 | A * | 4/1950 | Miller ................... | F16B 7/1445 248/188.5 |

(Continued)

FOREIGN PATENT DOCUMENTS

CN          201651699 U     11/2010

*Primary Examiner* — Matthew R McMahon
(74) *Attorney, Agent, or Firm* — Osha Liang LLP

(57) ABSTRACT

A telescopic waterproof tube structure includes at least two connection tubes nested with each other, and a locking structure for locking two adjacent connection tubes that are made of an inner tube sleeved inside an outer tube. The locking structure includes an inner reducing sleeve fixed on an end of the outer tube, an outer reducing sleeve adjustably connected to the inner reducing sleeve, and a locking assembly provided between the inner reducing sleeve and the end to be connected of the inner tube. The locking assembly moves axially towards the inner reducing sleeve under the action of the outer reducing sleeve to clamp the inner tube on said inner reducing sleeve. A first sealing structure is provided between the inner and outer reducing sleeves. An activity seal slot surrounding the inner tube forms between the outer reducing sleeve and the locking assembly and accommodates a second sealing structure therein.

17 Claims, 6 Drawing Sheets

(56) References Cited

U.S. PATENT DOCUMENTS

| | | | | |
|---|---|---|---|---|
| 2,542,967 | A * | 2/1951 | Waechter | F16B 7/1445 248/188.5 |
| 3,844,138 | A * | 10/1974 | Samiran | F16B 7/1445 188/83 |
| 4,028,783 | A * | 6/1977 | Buck | B41F 13/02 101/422 |
| 4,277,197 | A * | 7/1981 | Bingham | B25G 1/04 403/104 |
| 4,659,126 | A * | 4/1987 | Breck | B25B 27/023 269/48.1 |
| 4,757,778 | A * | 7/1988 | Scaglia | B63B 35/7959 114/97 |
| 4,782,845 | A * | 11/1988 | Chou | A45B 9/00 135/75 |
| 6,123,364 | A * | 9/2000 | Inoue | F16L 19/086 285/104 |
| 6,824,319 | B1 * | 11/2004 | Speggiorin | F16C 11/10 248/168 |
| 6,966,530 | B2 * | 11/2005 | Hsu | F16B 7/10 248/205.5 |
| 7,007,909 | B2 * | 3/2006 | Hsieh | F16B 7/1463 248/412 |
| 8,117,787 | B2 * | 2/2012 | Lee | E04G 25/06 248/354.1 |
| 8,506,200 | B2 * | 8/2013 | Lu | F16B 7/1463 403/109.2 |
| 8,534,715 | B2 * | 9/2013 | Abbasi | E04D 13/08 285/145.5 |
| 9,309,920 | B2 * | 4/2016 | Li | F16C 11/0623 |
| 2006/0197342 | A1 * | 9/2006 | Yen | F16L 15/02 285/298 |
| 2010/0064739 | A1 * | 3/2010 | Lu | F16M 11/34 70/57 |

* cited by examiner

TELESCOPIC WATERPROOF TUBE STRUCTURE

CROSS REFERENCE TO RELATED APPLICATIONS

This claims priority to Chinese Application No. CN201410767582.6, filed on Dec. 12, 2014, the disclosure of which is incorporated by reference in its entirety.

FIELD OF THE INVENTION

The present invention relates to the field of telescopic tube, specifically relates to a telescopic waterproof tube structure.

BACKGROUND OF THE INVENTION

The telescopic tube structure comprises an outer tube, an inner tube elastically sleeved by said outer tube and a locking structure for locking two adjacent connection tubes into an integral piece. The locking structure of prior arts only has a locking function, but does not have a waterproof function, when the telescopic tube is used in the water, water and sand will enter the telescopic tube, this may lead to an unsmooth telescopic effect between the inner tube and the outer tube, even damage to the internal components.

The telescopic tubes are usually used on tripod of photographic equipments. In the field of photographic equipment, a foot tube of a tripod is usually in the form of a telescopic tube, in order to solve the problem of non-watertight locking structure of foot tube in the prior art, Chinese patent CN201651699U discloses a locking waterproof structure of leg tubes, comprising a threaded sleeve tube, a rubber sleeve, a locking part and a locking knob component, the upper portion of the threaded sleeve tube is connected with an upper tube of a tripod leg tube, a holding cavity with the opened lower end is formed between the lower portion of the threaded sleeve tube and a lower tube of the tripod leg tube, the locking part is sleeved onto the lower tube and arranged in the holding cavity, the rubber sleeve is sleeved on the upper portion of the threaded sleeve tube, the locking knob component comprises a lock ring sleeve and a rubber part coated outside the lock ring sleeve, the lock ring sleeve is fittingly connected with the threaded sleeve tube in a thread manner, the bottom end of the rubber part is provided with a rubber part converging portion which is in interference fit with the lower tube, and the thickness of the rubber sleeve meets the requirement that the upper end of the inner wall of the lock ring sleeve and the outer wall of the rubber sleeve are in interference fit after the rubber sleeve is locked through rotating the locking knob component.

The waterproof of the lower end of the locking waterproof structure of leg tubes in the above patent document is achieved by providing a rubber sleeve at the lower end face of the lock ring sleeve, the sealing between the locking ring sleeve and the lower tube is achieved by the interference fit between the rubber part converging portion and the lower tube, during the telescopic adjustment between the upper tube and the lower tube, the rubber part converging portion is easy to be abraded, therefore the interference fit is easy to be destroyed, which eventually affects the sealing between the rubber part and the lower tube, thus, leads to a poor waterproof effect, besides, the exposed rubber part may lead to an external abrasion and corrosion, even can be peeled off from the end face, so that the waterproof performance of the locking structure is affected and even lost.

SUMMARY OF THE INVENTION

Thus, the technical problem to be solved by the present invention is that the sealing member of the waterproof locking structure of foot tube of the prior art is not properly arranged, which results in a weak sealing effect and causes the sealing member to be damaged and detached easily, so as to provide a waterproof locking structure of a telescopic tube with a simple structure, a better sealing effect and a longer life time.

In order to solve the above mentioned technical problem, the present invention provides a telescopic waterproof tube structure, comprising at least two connection tubes, with one said tube sleeved on the other; and a locking structure, provided between two adjacent connection tubes, for locking two adjacent connection tubes into an integral piece; the two adjacent connection tubes comprises an outer tube, and an inner tube, sleeved by said outer tube in a telescopic manner; said locking structure comprises an inner reducing sleeve, fixed on one end of said outer tube, an outer reducing sleeve, connected with said inner reducing sleeve in an axially adjustable manner, and a locking assembly, provided between said inner reducing sleeve and a connection end of said inner tube and adapted for moving axially towards said inner reducing sleeve under the action of said outer reducing sleeve, so as to clamp and lock said inner tube on said inner reducing sleeve; a first sealing structure, provided between said inner reducing sleeve and said outer reducing sleeve, wherein, a slot for providing a slidable sealing, provided surrounding said inner tube is formed between said outer reducing sleeve and said locking assembly, a second sealing structure is provided in the slot, two opposite slot walls of the slot are respectively formed by a first end face formed on said outer reducing sleeve and a second end face formed on said locking assembly, and when said outer reducing sleeve moves relative to said locking assembly axially towards the end where said out outer tube is located, the distance between said first end face and said second end face is adapted for being shortened, and said second sealing structure is squeezed, so as to provide a sealing.

In a class of embodiment of the present invention, said outer reducing sleeve comprises an outer reducing tube, and a first base plate with a centre hole, provided on one end of said outer reducing tube; an inner side of said first base plate forms said first end face; said locking assembly comprises a locking member, and a second base plate, connected to an end of said locking assembly and arranged towards said first end face, an outer side of said second base plate forms said second end face; an inner wall of said reducing tube between said first end face and said second end face forms a slot bottom of the slot.

In a class of embodiment of the present invention, an end of said inner reducing sleeve arranged towards said locking member forms an inner conical surface, said locking member is in the form of a locking ring with a conical opening, said locking ring clamps said inner tube under the constraint of said inner conical surface.

In a class of embodiment of the present invention, a cover, in the form of a snap ring, is provided at an end of said locking ring; said second base plate is formed by a base plate of said cover; a groove is formed on an outer surface of a circumferential side wall of said locking ring; a bulge, adapted for being inserted into said groove, is formed radially on an inner wall of a circumferential side wall of said cover, said cover connects to said locking ring by said bulge inserted into said groove.

In a class of embodiment of the present invention, a step provided opposite said first end face is formed on an inner wall of said outer reducing tube, said cover is provided between said step and said first end face.

In a class of embodiment of the present invention, said first base plate is an end cover connected to one end of said outer reducing tube, and a sealing is provided at a joint of said end cover and said outer reducing tube.

In a class of embodiment of the present invention, said end cover is connected to an end of said outer reducing tube by a thread, and a sealing is provided at the position where the thread is formed.

In a class of embodiment of the present invention, an outer reducing rubber sleeve is provided on said outer reducing sleeve.

In a class of embodiment of the present invention, an external thread is provided on said inner reducing sleeve, an internal thread is provided on said outer reducing sleeve, said outer reducing sleeve is connected to said inner reducing sleeve by a thread.

In a class of embodiment of the present embodiment, said first sealing structure and said second sealing structure are in the form of a seal ring; preferably a foot nail is provided on said connection tube on one end of the telescopic waterproof tube structure, and a sealing is provided at a joint of said foot nail and said connection tube; preferably said foot nail is connected to said connection tube arranged on the end by a foot tube joint, a first internal thread is provided on one end of said connection tube arranged on the end, a first external thread, fitting the first internal thread, is provided on one end of said foot tube joint; a blind hole is formed on the other end of said foot tube joint, a second internal thread is formed in said blind hole, the foot nail has a second external thread formed thereon, which fits said second internal thread, said foot nail is connected to said foot tube joint by thread, and a sealing is provided at a joint of said first internal thread and said first external thread.

Comparing with the prior arts, the above technical solutions of the present invention have the following advantages:

1. In the present invention, the waterproof and dustproof at the upper end and lower end of the connection part of the telescopic tube structure is achieved by the first sealing structure provided between the inner reducing sleeve and the outer reducing sleeve, and the second sealing structure provided between the outer reducing sleeve and the inner tube. Since the slot for providing a slidable sealing, which is for mounting the second sealing structure, is formed between the outer reducing sleeve and the locking assembly, thus, the second sealing structure is completely locked in the locking structure, so that the damage from the outside can be prevented. The more important thing is that since the slot for mounting the second sealing structure is the one for providing a slidable sealing, the arrangement of the slot does not affect the pushing action to locking assembly from the outer reducing sleeve, and may provide a sealing between the inner tube and the outer reducing sleeve through the second sealing structure compressed and deformed due to a narrowed space of the slot, when the locking assembly is locked, thus, comparing with a slot for providing a fixed sealing, the sealing effect of the slot for providing a slidable sealing is more reliable; when the locking assembly is unlocked, the space of the slot for providing a slidable sealing becomes larger, and the compressed second sealing structure may gradually recover to its original state, so that a gap may be formed between the second sealing structure and the inner tube and the second sealing structure and the inner tube may be separated, thus, when adjusting the length formed by the inner tube and the outer tube, the second sealing structure will not be abraded by the movement of the inner tube, which makes the adjustment of the inner tube more smoothly and saves labour. And because of the slot of the present invention, the installation of the sealing member is very convenient.

2. In the present invention, the outer reducing sleeve controls the cover by the end cover and the step, so as to control the locking and unlocking of the locking ring, thus the structure is very simple, and the operation is very convenient, as the user only needs to rotate the outer reducing sleeve in forward and reverse directions.

3. In the present invention, there are at least two connection tubes, a locking structure provided between two adjacent connection tubes, one of the two adjacent connection tubes is an outer tube 1, and the other is an inner tube elastically sleeved inside the outer tube. This structure can achieve the multi layer telescopic effect.

4. When the telescopic waterproof tube structure is used on a foot tube, a foot nail is connected to a connection tube on the lower end in a sealed manner, thus, the whole foot tube can be sealed well, and when it is used in the water, the waterproof effect is good.

BRIEF DESCRIPTION OF THE DRAWINGS

In order to make the invention easier to be clearly understood, the invention will be described in greater detail with references to the embodiments and the appended drawings, wherein.

Wherein, 1—outer tube, 2—inner tube, 3—inner reducing sleeve, 4—outer reducing sleeve, 5—first sealing structure, 6—second sealing structure, 7—first end face, 8—second end face, 9—outer reducing tube, 10—locking ring, 11—cover, 12—step, 13—end cover, 14—outer reducing rubber sleeve, 15—foot nail, 16—foot tube joint, 17—blind hole.

DETAILED DESCRIPTION

The present invention will be described in greater detail with references to the appended drawings.

Embodiment 1

Figure 1:
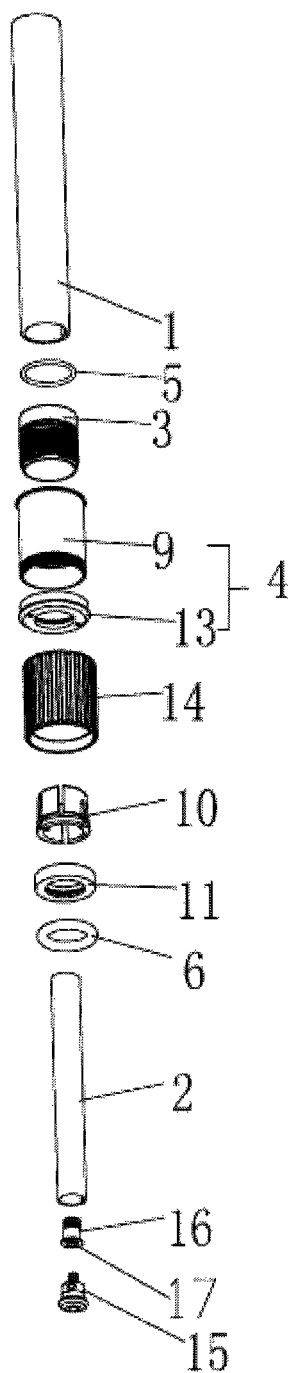
FIG. 1 is an explosive view of the telescopic waterproof tube structure of the present invention.
Figure 2:
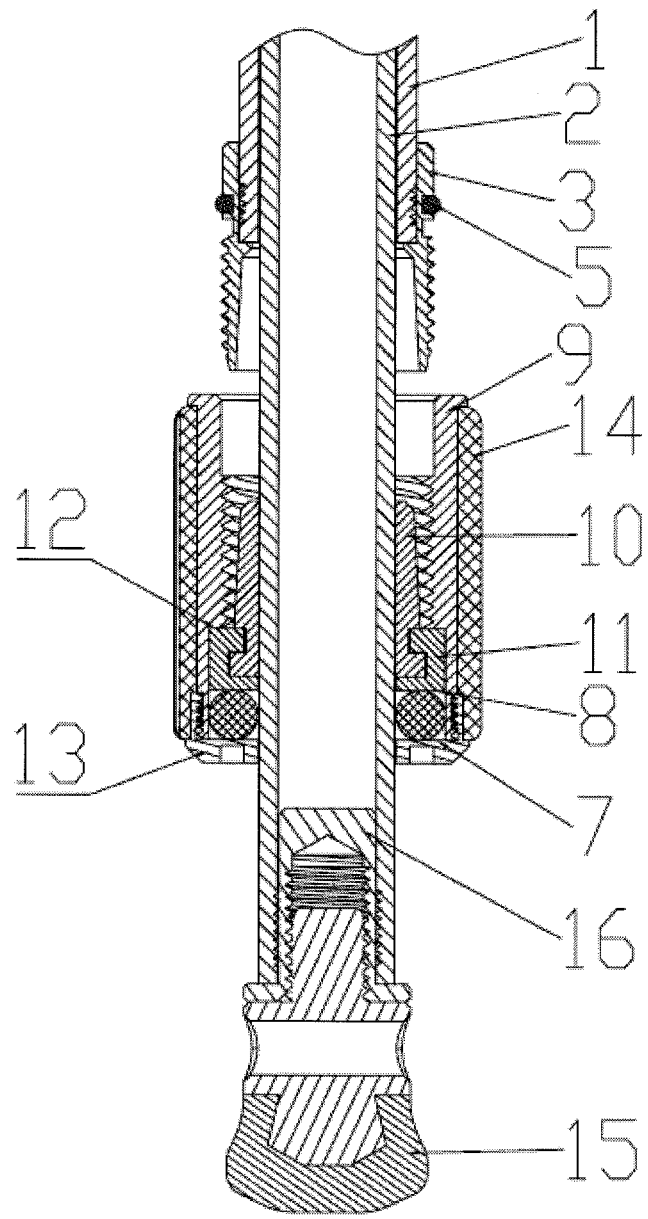
FIG. 2 is a sectional view of the telescopic waterproof tube structure of the present invention in the unlocked state.
Figure 3:
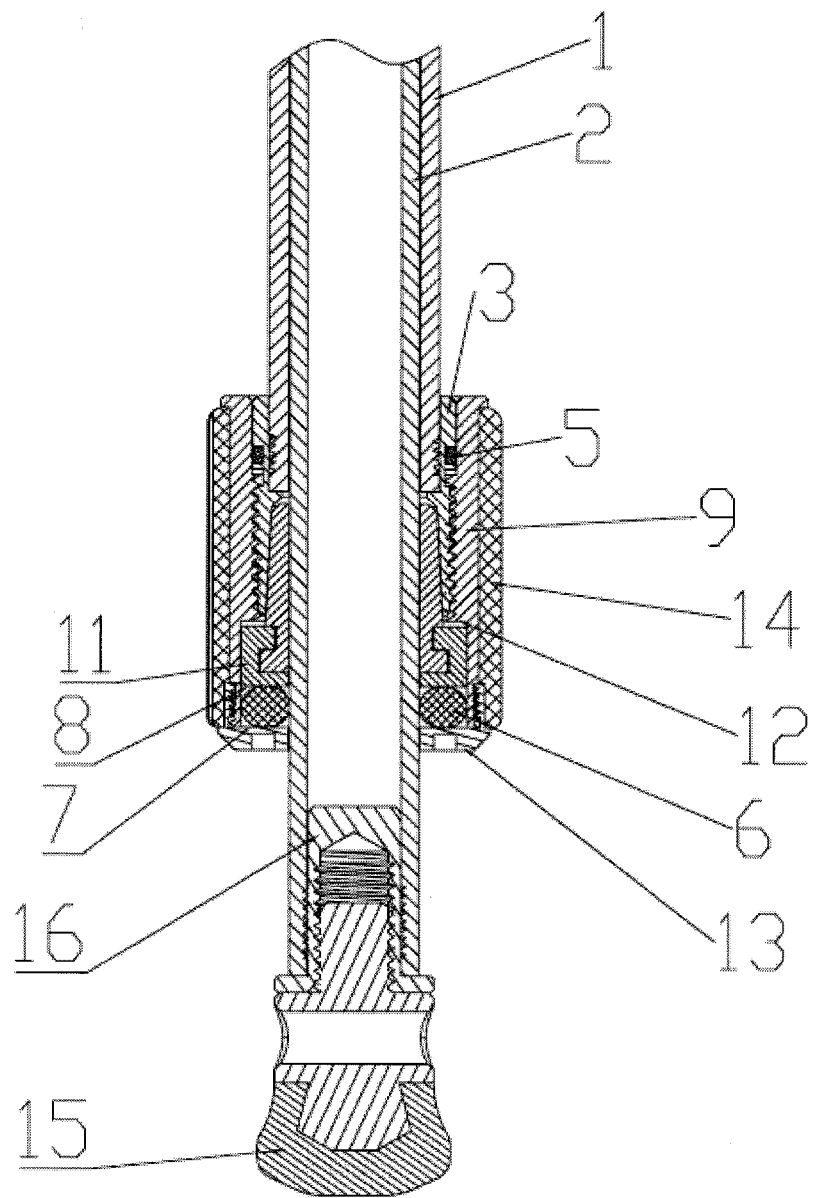
FIG. 3 is a sectional view of the telescopic waterproof tube structure of the present invention in a locked state.

As shown in FIG. 1-3, the telescopic waterproof tube structure of the present embodiment comprises an outer tube 1 and an inner tube 2 sleeved by said outer tube 1 in a telescopic manner, a locking structure for locking two adjacent connection tubes into an integral piece, the locking structure comprises an inner reducing sleeve 3 fixed on one end of the outer tube 1, an outer reducing sleeve 4 connected with said inner reducing sleeve 3 in an axially adjustable manner, a locking assembly provided between the inner reducing sleeve 3 and a connection end of the inner tube 2 and adapted for moving axially towards said inner reducing sleeve 3 under the action of said outer reducing sleeve 4, so as to clamp and lock said inner tube 2 on said inner reducing sleeve 3, a first sealing structure 5 provided between said inner reducing sleeve 3 and said outer reducing sleeve 4; a slot for providing a slidable sealing, provided surrounding said inner tube 2, is formed between said outer reducing sleeve 4 and said locking assembly, a second sealing structure 6 is provided in the slot; two opposite slot walls of the slot are respectively formed by a first end face 7 formed on said outer reducing sleeve 4 and a second end face 8 formed on said locking assembly, and when said outer reducing sleeve 4 moves relative to said locking assembly axially towards the end where said out outer tube 1 is located, the distance between said first end face 7 and said second end face 8 is adapted for being shortened, and said second sealing structure 6 is squeezed, so as to provide a sealing.

In the above embodiment, the waterproof and dustproof at the upper end and lower end of the connection part of the telescopic tube structure is achieved by the first sealing structure 5 provided between the inner reducing sleeve 3 and the outer reducing sleeve 4, and the second sealing structure 6 provided between the outer reducing sleeve 4 and the inner tube. Since the slot for providing a slidable sealing, which is for mounting the second sealing structure 6, is formed between the outer reducing sleeve 4 and the locking assembly, thus, the second sealing structure 6 is completely locked in the locking structure, so that the damage from the outside can be prevented. The more important thing is that since the slot for mounting the second sealing structure is the one for providing a slidable sealing, the arrangement of the slot does not affect the pushing action to the locking assembly from the outer reducing sleeve, and the second sealing structure 6 may provide a sealing between the inner tube and the outer reducing sleeve 4 after it is compressed and deformed due to a narrowed space of the slot, when the locking assembly is in a locked state, thus, compared with a slot for providing a fixed sealing, the sealing effect of the slot for providing a slidable sealing is more reliable; when the locking assembly is in an unlocked state, the space of the slot for providing a slidable sealing is enlarged, and the second sealing structure may gradually recover from a compressed state to its original state, so that a gap may be formed between the second sealing structure 6 and the inner tube, and the second sealing structure and the inner tube may be separated, thus, when adjusting the length formed by the inner tube and the outer tube, the second sealing structure will not be abraded by the movement of the inner tube 2, which makes the adjustment of the inner tube more smoothly and saves labor. And because of the slot of the present invention, the installation of the sealing member can be very convenient.

As a preferred embodiment, the first sealing structure 5 and the second sealing structure are in the form of a seal ring respectively, of course, in alternative embodiments, the first sealing structure 5 can be formed by two seal rings, or by one seal ring and one rubber ring, or a sealing structure that is able to provide a sealing between the inner reducing sleeve 3 and the outer reducing sleeve 4, but do not affect the axial movement of the outer reducing sleeve 4 along the inner reducing sleeve 3, the second sealing structure can also be two seal rings or other compressible and deformable sealing structure. An external thread is provided on the inner reducing sleeve 3, an internal thread is provided on the outer reducing sleeve 4, the outer reducing sleeve 4 is connected to the inner reducing sleeve 3 by thread, the reducing sleeve 4 can move axially forward or backward along the inner reducing sleeve 3 if it is rotated. The outer reducing sleeve 4 comprises a outer reducing tube 9, and a first base plate with a center hole provided on the end close to the outer reducing tube 9, the first end face 7 is formed at the inner side of the first base plate and said center hole is adapted for the inner tube to pass through; the locking assembly comprises a locking member, and a second base plate connected to an end of the locking assembly, which is arranged towards the first end face 7, the second end face 8 is formed at the outer side of the second base plate, the bottom of the slot for providing a slidable sealing is formed by the inner wall of the reducing tube 9 between the first end face 7 and the second end face 8.

In order to obtain a simple structure of the telescopic waterproof tube structure of the present invention and a reliable locking effect, preferably, an end of the inner reducing sleeve 3, which is arranged towards the locking member, forms an inner conical surface, the locking member is in the form of a locking ring 10 with a conical opening, the locking ring 10 clamps the inner tube 2 under the constraint of the inner conical surface.

A cover 11, in the form of a snap ring, is provided at an end of the locking ring 10, the second base plate is formed by a base plate of the cover 11, a groove is formed on an outer surface of a circumferential side wall of the locking ring 10, a bulge, adapted for being inserted into the groove is formed radially on an inner wall of a circumferential side wall of the cover 11, the cover 11 connects to the locking ring 10 by the bulge inserting into the groove. Preferably, the groove is a circular groove, and the bulge is a circular bulge, so that it is convenient to mount the cover 11 on the locking ring 10.

In order to unlock the locking assembly from the inner conical surface conveniently, a step 12 provided opposite the first end face 7 is formed on the inner wall of the outer reducing tube 9, the cover is provided between the step 12 and the first end face 7. Thus, when the outer reducing tube 9 moves in the direction away from the inner reducing sleeve, the locking assembly can be pushed out from the inner conical surface by the step 12.

In order to form the outer reducing sleeve 4 conveniently, the first base plate is an end cover 13 connected to one end of the outer reducing tube 9, the end cover 13 is connected to an end of the outer reducing tube 9 by thread, and a sealing is formed at the thread by glue.

An outer reducing rubber sleeve 14 is provided on the outer reducing sleeve 4, in order to rotate the outer reducing sleeve conveniently and gain a high usability.

The inner reducing sleeve can be formed on the outer tube, however, in order to facilitate the forming of the outer tube 1 and the inner reducing sleeve 3, the inner reducing sleeve 3 is connected to an end of the outer tube 1 by thread, and a sealing is provided at the thread by glue.

When the telescopic waterproof tube structure of the present invention is used as a foot tube of a tripod, preferably, a foot nail 15 is provided on one end of the inner tube 2, which is not connected to the outer tube 1. The foot nail 15 is connected to the inner tube 2 through a foot tube joint 16, a first internal thread is provided on an end of the inner tube 2, and a first external thread, fitting the first internal thread, is provided on one end of the foot tube joint 16, while a blind hole 17 is formed on the other end of the foot tube joint 16, a second internal thread is formed in the blind hole 17, and a second external thread fitting the second internal thread, is provided on the foot nail 15, the foot nail 15 is connected to the foot tube joint 16 by thread, and a sealing is provided at the joint of the first internal thread and the first external thread by glue. Thus, the whole foot tube is sealed well from the top down, and when using in the water, the waterproof effect can be very good.

Embodiment 2

Figure 4:
FIG. 4 is a structure schematic view of the telescopic waterproof tube structure of the present invention when disposed on one foot tube of a tripod.
Figure 5:
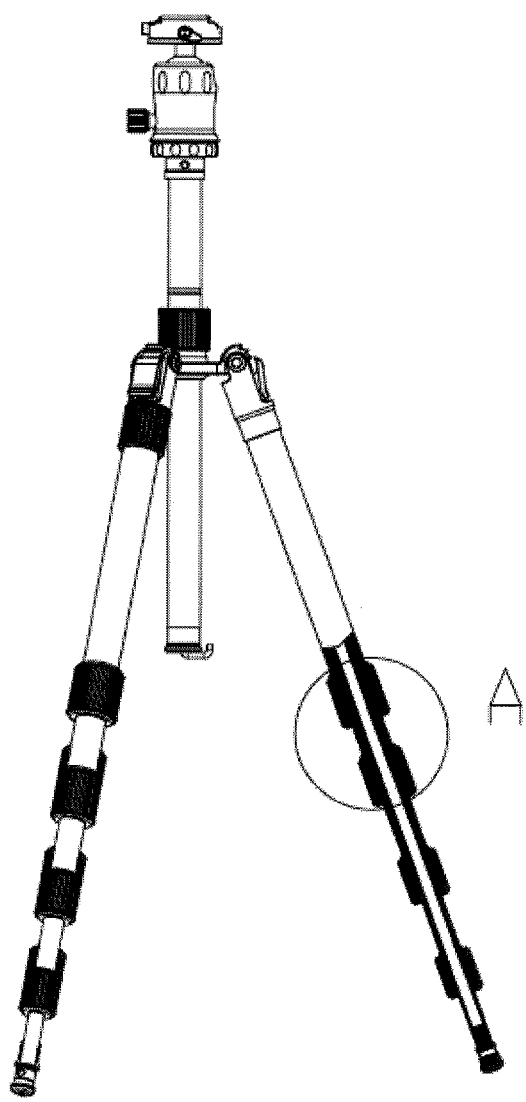
FIG. 5 is a structure schematic view of the foot tube in FIG. 4 mounted on the tripod.
Figure 6:
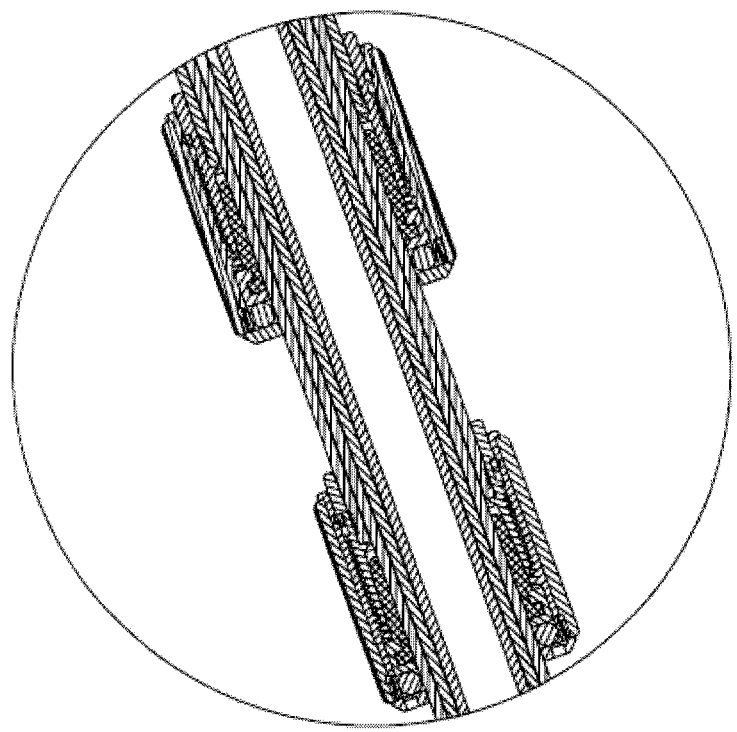
FIG. 6 is an enlarged view of part A in FIG. 5.

As shown in FIG. 4-6, the difference between embodiment 2 and embodiment 1 is that the embodiment 2 comprises five connection tubes, four locking structures for respectively locking two adjacent connection tubes into an integral piece, wherein, one of the two adjacent connection tubes is an outer tube 1, and the other is an inner tube 2 elastically sleeved by the outer tube 1. Comprised with the embodiment 1, the design of the embodiment 2 can achieve multi layer extension. FIG. 5 is a structure schematic view of the foot tube in embodiment 2 mounted on the tripod, the foot nail 15 is provided on the end of the first connection tube with a minimum inner diameter, which allows a good waterproof effect of the whole foot tube, and the foot tube can be used in the water. The embodiment 2 is just an example, and the number of the connection tubes may vary according to the specific requirements, for example, three, four, six or more.

The adjustment process of the telescopic waterproof tube structure in the present invention is provided as bellow:

When there is a need of adjusting the length of the inner tube 2 and the outer tube 1 that is locked with the inner tube as an integral piece, the outer reducing sleeve 4 can be rotated reversely, the outer reducing sleeve is rotated to move backward in the axial direction of the inner reducing sleeve 3, the second sealing structure is released, after the outer reducing sleeve move backward for a certain distance, the step 12 on the outer reducing sleeve contacts with the cover, and draws the locking assembly out of the inner conical surface and unlocks the same by driving the cover, at this time, the length between the inner tube 2 and the outer tube 1 can be adjusted.

When the length between inner tube 2 and the outer tube 1 is adjusted to the required length, the outer reducing sleeve 4 can be rotated forward, the outer reducing sleeve is rotated to move forward in the axial direction of the inner reducing sleeve 3, so as to push the second sealing structure to drive the locking assembly to move towards the inner conical surface until being inserted into the inner conical surface and locked, then the outer reducing sleeve 4 is rotated, the second sealing structure is compressed and deformed, so that the space between the outer reducing sleeve 4 and the inner tube 2 is reliably sealed.

Obviously, the above mentioned embodiments are for clearly explaining the present invention, which do not constitute undue limitation of the present invention. It is obviously to the skilled person in the art that, various modifications could be derived without departing from the spirits and the effects of the invention. And there is no need to describe all the embodiments. Therefore, the modifications or alternations derived thereof are still included in the protection scope of the present invention.

What is claimed is:

1. A telescopic waterproof tube structure, comprising:
   at least two connection tubes, with one said tube sleeved on the other; and
   a locking structure, provided between two adjacent connection tubes, for locking the two adjacent connection tubes into an integral piece,
   wherein the two adjacent connection tubes comprise:
      an outer tube (1), and
      an inner tube (2), sleeved by said outer tube (1) in a telescopic manner,
   wherein said locking structure comprises:
      an inner reducing sleeve (3), fixed on one end of said outer tube (1),
      an outer reducing sleeve (4), connected with said inner reducing sleeve (3) in an axially adjustable manner, and
      a locking assembly, provided between said inner reducing sleeve (3) and a connection end of said inner tube (2) and adapted to move axially towards said inner reducing sleeve (3) under an action of said outer reducing sleeve (4), so as to clamp and lock said inner tube (2) on said inner reducing sleeve (3);
      a first sealing structure (5), provided between said inner reducing sleeve (3) and said outer reducing sleeve (4),
      wherein a slot for providing an adjustable sealing, provided surrounding said inner tube (2), is formed between said outer reducing sleeve (4) and said locking assembly,
      a second sealing structure (6) is provided in the slot, wherein the second sealing structure (6) is a compressible and deformable sealing structure that undergoes elastic deformation when being compressed,
      two opposite slot walls of the slot are respectively formed by a first end face (7) formed on said outer reducing sleeve (4) and a second end face (8) formed on said locking assembly, and when said outer reducing sleeve (4) moves relative to said locking assembly axially towards the end where said outer tube (1) is located, the distance between said first end face (7) and said second end face (8) is adapted for being shortened, and said second sealing structure (6) is axially compressed to become elastically deformed, so as to provide the adjustable sealing,
      said outer reducing sleeve (4) comprises:
         an outer reducing tube (9), and
         a first base plate with a central hole, provided on one end of said outer reducing tube (9);
      an inner side of said first base plate forms said first end face (7);
      said locking assembly comprises:
         a locking member, and
         a second base plate, connected to an end of said locking assembly and arranged towards said first end face (7),
      an outer side of said second base plate forms said second end face (8); and
      an inner wall of said outer reducing tube (9) between said first end face (7) and said second end face (8) forms a slot bottom of the slot.

2. The telescopic waterproof tube structure of claim 1, wherein
   an end of said inner reducing sleeve (3) arranged towards said locking member forms an inner conical surface,
   said locking member is in the form of a locking ring (10) with an outer conical surface, said locking ring (10) clamps said inner tube (2) under the constraint of said inner conical surface.

3. The telescopic waterproof tube structure of claim 2, wherein
   a cover (11), in the form of a snap ring, is provided at an end of said locking ring (10);

said second base plate is formed by a base plate of said cover (11);

a groove is formed on an outer surface of a circumferential side wall of said locking ring (10);

a bulge, adapted for being inserted into said groove, is formed radially on an inner wall of a circumferential side wall of said cover (11), said cover (11) connects to said locking ring (10) by said bulge inserted into said groove.

4. The telescopic waterproof tube structure of claim 2, wherein
an outer reducing rubber sleeve (14) is provided on said outer reducing sleeve (4).

5. The telescopic waterproof tube structure of claim 3, wherein
a step (12) provided opposite said first end face (7) is formed on an inner wall of said outer reducing tube (9), said cover is provided between said step (12) and said first end face (7).

6. The telescopic waterproof tube structure of claim 3, wherein
an outer reducing rubber sleeve (14) is provided on said outer reducing sleeve (4).

7. The telescopic waterproof tube structure of claim 5, wherein
said first base plate is an end cover (13) connected to one end of said outer reducing tube (9), and a sealing is provided at a joint of said end cover (13) and said outer reducing tube (9).

8. The telescopic waterproof tube structure of claim 5, wherein
an outer reducing rubber sleeve (14) is provided on said outer reducing sleeve (4).

9. The telescopic waterproof tube structure of claim 7, wherein
said end cover (13) is connected to an end of said outer reducing tube (9) by a thread, and a sealing is provided at the position where the thread is formed.

10. The telescopic waterproof tube structure of claim 7, wherein
an outer reducing rubber sleeve (14) is provided on said outer reducing sleeve (4).

11. The telescopic waterproof tube structure of claim 9, wherein
an outer reducing rubber sleeve (14) is provided on said outer reducing sleeve (4).

12. The telescopic waterproof tube structure of claim 1, wherein
an outer reducing rubber sleeve (14) is provided on said outer reducing sleeve (4).

13. The telescopic waterproof tube structure of claim 1, wherein
said inner reducing sleeve (3) is connected to one end of said outer tube (1) by a thread, and a sealing is provided at the position where the thread is formed.

14. The telescopic waterproof tube structure of claim 13, wherein
an external thread is provided on said inner reducing sleeve (3), an internal thread is provided on said outer reducing sleeve (4), said outer reducing sleeve (4) is connected to said inner reducing sleeve (3) by a thread.

15. The telescopic waterproof tube structure of claim 1, wherein
said first sealing structure (5) and said second sealing structure (6) are in the form of a seal ring.

16. The telescopic waterproof tube structure of claim 1, wherein
a foot nail (15) is provided on said inner tube (2) or outer tube (1) on one end of the telescopic waterproof tube structure, and a sealing is provided at a joint of said foot nail (15) and said inner tube (2) or outer tube (1).

17. The telescopic waterproof tube structure of claim 16, wherein
said foot nail (15) is connected to said inner tube (2) or outer tube (1) arranged on one end by a foot tube joint (16), a first internal thread is provided on one end of said inner tube (2) or outer tube (1) arranged on the end, a first external thread, fitting the first internal thread, is provided on one end of said foot tube joint (16);

a blind hole (17) is formed on the other end of said foot tube joint (16), a second internal thread is formed in said blind hole (17), the foot nail (15) has a second external thread formed thereon, which fits said second internal thread, said foot nail (15) is connected to said foot tube joint (16) by thread, and a sealing is provided at a joint of said first internal thread and said first external thread.

* * * * *